Nov. 7, 1961  U. VEIEL ET AL  3,007,204
PROCESS FOR BIAXIALLY STRETCHING POLYMERIC FILMS
Filed Dec. 17, 1958
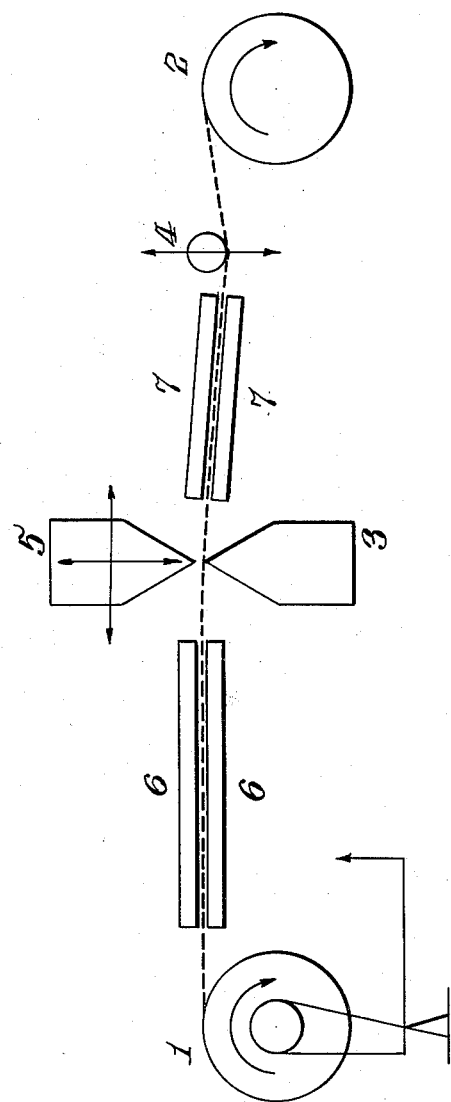
INVENTORS
*Ulrich Veiel,*
*Arthur Prietzschk,*
*Hermann Schnell*
BY *Connolly and Hutz*
ATTORNEYS

3,007,204
PROCESS FOR BIAXIALLY STRETCHING POLYMERIC FILMS
Ulrich Veiel, Krefeld-Uerdingen, Artur Prietzschk, Dormagen, and Hermann Schnell, Krefeld-Uerdingen, Germany, assignors to Farbenfabriken Bayer Aktiengesellschaft, Leverkusen, Germany, a corporation of Germany
Filed Dec. 17, 1958, Ser. No. 781,045
Claims priority, application Germany Jan. 8, 1958
6 Claims. (Cl. 18—48)

This invention is concerned with a process for stretching bodies made from plasic materials.

It is known that bodies made from high molecular weight thermoplastic crystallisable materials, such as polyamides, polyurethanes, polyesters and polycarbonates, can be orientated by stretching at temperatures below their softening point. The thread molecule becomes parallel to the direction of stretching and the physical properties, particularly the tensile strength, are substantially improved.

The stretching can, in general, be carried out at room temperature or at elevated temperatures. According to the properties of the plastic material, particularly its tendency to crystallisation and, as could be shown with certain crystallisable polycarbonates, the position of its second order transition point, there is a definite range of temperature or a maximal temperature for some plastic materials where this deformation is preferably carried out and which leads to the most favourable results. In the case of the mentioned polycarbonates, for example, this temperature range lies in the region of and particularly above the second order transition point and beneath the melting point.

Bodies, whose measurement is substantially greater in one dimension than in the other, such as fibres, threads or bristles, can, of course, only be deformed in the longitudinal direction. In the case of the longitudinal stretching of films, foils and strips, whose measurements in two directions are markedly different, these bodies undergo a considerable diminution in breadth. In this case, a substantial improvement of the physical properties usually occurs in the direction of stretch in comparison with the initial condition whereas these properties in the transverse direction usually deteriorate. The bodies thus tend, for example, to splinter parallel to the direction of stretch. Films, foils and strips are, therefore, usually deformed longitudinally and transversely whereby the stretching can take place in both directions simultaneously or consecutively. In this case, however, tedious and complicated technical procedures are necessary.

We have now found that the longitudinal and oblique deformation of films, foils and strips of thermoplastic, crystallisable plastic materials, particularly polycarbonates, can be carried out in a manner which is technically and particularly simple and advantageous in that such bodies are drawn with a force sufficient for the longitudinal deformation transversely over a suitable heated edge with a suitable surface. According to the radius of this edge and the size of the angle (contact force), the bodies passed thereover experience an increase of temperature of more or less short duration and a simultaneous retardation. These two effects have the result that the deformation first takes place on the edge and that practically none or only a very limited diminution in breadth occurs. Therefore, by this method of procedure, dimensions of the bodies are obtained which would have been obtained had the body first only been stretched in one direction and then stretched again in a direction at right angles thereto, bringing the breadth to its original dimensions or had the body been stretched simultaneously in two directions in such a manner that the breadth of the body would not have been substantially altered.

Since the stretching force produced in this manner is, as a rule, not sufficient in order to produce a stretching or a sufficient degree of stretching, it is expedient to give the bodies a suitable chosen pre-stretching, for example, by passing the bodies in a known manner from a suitably braked ceiling spool to a driven winding spool, the mentioned edge being positioned between these spools in such a manner that the bodies drawn over this edge are bent.

In order to give to the bodies passing over the edge in the line of contact with the edge the maximal stretching temperature, the edge is heated to a suitable temperature, i.e. almost to a temperature somewhat above the maximal stretching temperature.

The achievement of the maximal stretching temperature in the line of contact of the bodies with the edge can, particularly in the case of thick bodies, possibly also be helped in that heat is applied to or removed from the bodies in the line of stretching or, possibly, shortly before, even from the side opposite to the one against the edge, e.g. by bringing up a second edge at a suitable temperature which, nevertheless, does not touch the first edge, or by irradiation with infra red rays.

If the maximal stretching temperature is comparatively high or low, it is expedient to warm or cool the bodies before they reach the heated edge to a temperature which lies slightly below the maximal stretching temperatures.

In some cases, particularly if the maximal stretching temperature is not high, it can also be expedient to cool the bodies immediately after passing the edge, for example, by blowing with cold air or a cold inert gas or by the action of a cooling fluid.

For carrying out of the process according to the present invention, an apparatus, the important features of which are illustrated in the accompanying schematic elevational drawing is suitable. It consists of an optionally braked feed spool 1, a driven winding spool 2 and a heated edge 3 arranged between the two spools in such a manner that the body running from spool 1 to spool 2 is bent over said edge. The angle of bending can be regulated by an adjustable tension roller 4 arranged between the edge 3 and the winding spool 2. The device can also contain a suitable heated edge 5 positioned opposite to the heated edge 3 for additional application of heat. The edge 5 is preferably displaceably arranged with regard to edge 3, and is parallel to the direction of movement of the body. Finally, for the previous adjustment of temperature of the body, a pre-heating or pre-cooling device 6 can be provided between the feed spool 1 and the edge 3 and a cooling device 7 between the edge 3 and the winding spool 2.

With the help of the process according to the present invention, and possibly also the device according to the present invention, the stretching process can be controlled with a high degree of accuracy.

In particular, any degree of stretching can be maintained within the normal limits since the properties of the stretched bodies, particularly the cross-section and the thickness, the tensile strength, the lateral strength and the elongation depend, to a large extent, upon the degree of stretching so that it is usually desirable to maintain a definite degree of stretching and thus to produce bodies with definite properties. According to the present invention, it is very simple to produce bodies with exceptionally good mechanical properties in the longitudinal and diagonal directions of stretching. A further significant advantage is that the stretching over the total beadth of these bodies takes place substantially equally.

The following examples are given for the purpose of illustrating the invention:

*Example 1*

A strip made from high molecular weight, linear 2,2-(4,4'-dihydroxy-diphenyl)-propane polycrabonate (second order transition point 152° C.) is stretched in the manner according to the present invention. The data of the experiment are as follows:

| | |
|---|---|
| Thickness of the starting strip | 100μ |
| Breadth of the starting strip | 40 mm. |
| Tensile strength (longitudinal) of the starting strip | ~8.5 kg./mm.² |
| Lateral strength | ~6.8 kg./mm.² |
| Length of the pre-heating device | 500 mm. |
| Pre-heating temperature | 165° |
| Radius of the edge | 1 mm. |
| Temperature of the edge | 210° |
| Angle of the strip after the edge to the extension of the strip before the edge | 35–40° |
| Stretching force between the feed and winding spools | ~0.15 kg. |
| Speed of stretching | 1.2 m./min. |
| Ratio of stretching | 1:14.5 |
| Thickness of the strip after stretching | 5μ |
| Breadth of the strip after stretching i.e. the diminution in breadth amounts to 7.5% in comparison with, for example, about 70% in the case of stretching of the strip at 160° C. without the use of an edge | 37 mm. |
| Tensile strength (longitudinal) after stretching | 30–36 kg./mm.² |
| Lateral strength | 5.1 kg./mm.² |

*Example 2*

A strip from the same polycarbonate as in Example 1 is stretched by the process according to the present invention. The data of the experiment are as follows:

| | |
|---|---|
| Thickness of the strip before stretching | 200μ |
| Breadth of the strip before stretching | 35 mm. |
| Tensile strength (longitudinal) before stretching | ~8.5 kg./mm.² |
| Lateral strength before stretching | ~6.8 kg./mm.² |
| Length of the pre-heating device | 500 mm. |
| Pre-heating temperature | 200° |
| Radius of the edge | 1 mm. |
| Temperature of the edge | 182° |
| Angle of the strip after the edge to the extension of the strip before the edge | 35–40° |
| Temperature of the opposed edge | 170° |
| The distance of the opposed edge from the strip | 2 mm. |
| Displacement of the axis of the opposed edge from the axis of the lower edge in the direction of the feed spool | 6 mm. |
| Stretching force between the feed and winding spools | 2.4 kg. |
| Speed of stretching | 0.6 m./min. |
| Ratio of stretching | 1:4.7 |
| Thickness of the strip after stretching | 45μ |
| Breadth of the strip after stretching, i.e. the diminution in breadth amounts to 6% compared with, for example, about 60% in the case of stretching of the strip at 170° C. without the use of an edge | 33 mm. |
| Tensile strength (longitudinal) after stretching | ~20 kg./mm.² |
| Lateral strength after stretching | ~7 kg./mm.² |

We claim:

1. Process for the production of longitudinally and transversely stretched bodies of films, foils and strips, made from highly polymeric, thermoplastic, crystallizable plastic materials, which comprises drawing said bodies transversely over an edge having a small radius of curvature with the entire width of the bodies contacting said edge, and heating said edge to a temperature below the softening point of said material of said bodies, the drawing force being sufficient for stretching the bodies both longitudinally and transversely.

2. Process according to claim 1, wherein the plastic material is heated before reaching the heating edge.

3. Process according to claim 1, wherein the plastic material is cooled before reaching the heated edge.

4. Process according to claim 1, wherein the plastic material is cooled after passing over the heated edge.

5. Process according to claim 1, wherein the plastic material used is a highly polymeric thermoplastic polycarbonate.

6. Process according to claim 1 wherein the plastic material is drawn over the heated edge in such a manner that the material is bent.

References Cited in the file of this patent

UNITED STATES PATENTS

| | | |
|---|---|---|
| 2,659,931 | Dettmer | Nov. 24, 1953 |
| 2,771,635 | Munch | Nov. 27, 1956 |
| 2,804,652 | Balkan | Sept. 3, 1957 |
| 2,917,779 | Kurzke et al. | Dec. 22, 1959 |
| 2,925,641 | Evans | Feb. 23, 1960 |

FOREIGN PATENTS

| | | |
|---|---|---|
| 558,297 | Great Britain | Dec. 30, 1943 |
| 722,756 | Great Britain | Jan. 26, 1955 |